United States Patent [19]

Gaus et al.

[11] 4,195,846
[45] Apr. 1, 1980

[54] PHONOGRAPH TURNTABLE CONTROL SYSTEM

[75] Inventors: Harry Gaus, Kronberg; Udo Milutziki, Walldorf; Dietwald Schotte, Eschborn, all of Fed. Rep. of Germany

[73] Assignee: Braun Aktiengesellschaft, Frankfurt am Main, Fed. Rep. of Germany

[21] Appl. No.: 913,033

[22] Filed: Jun. 7, 1978

[51] Int. Cl.² ............................................. G11B 17/06
[52] U.S. Cl. .................................................. 274/15 R
[58] Field of Search ................. 274/9 R, 9 RA, 13 R, 274/15 R, 23 R, 10 R

[56] References Cited

FOREIGN PATENT DOCUMENTS

| | | | |
|---|---|---|---|
| 1136130 | 9/1962 | Fed. Rep. of Germany | 274/13 R |
| 2413972 | 9/1974 | Fed. Rep. of Germany | 274/23 R |
| 1072821 | 6/1967 | United Kingdom | 274/23 R |

Primary Examiner—Harry N. Haroian
Attorney, Agent, or Firm—Michael J. Striker

[57] ABSTRACT

When a touch-activated switch unit is touched a first time, a platter-motor flip-flop arrangement assumes its motor-operate state, and when the switch unit is touched a second time, the flip-flop assumes its motor-not-operate state. A tone-arm swing-in flip-flop assumes its swing-in state when the platter-motor flip-flop assumes its motor-operate state. A tone-arm swing-out flip-flop assumes its swing-out state when the platter-motor flip-flop assumes its motor-not-operate state. A signal-transmission switch closes the transmission path between the swing-in and swing-out flip-flops and the electrical drive of the tone-arm swing mechanism, but only when the tone-arm lift mechanism has lifted the tone arm to raised position. A touch-activated lift-tone-arm switch is operated when touched for generating a lift-tone-arm command signal. An OR-gate has an output connected to the tone-arm lift mechanism for activating the latter in response to the lift-tone-arm command signal, in response to assumption of the swing-in state by the swing-in flip-flop, and in response to assumption of the swing-out state by the swing-out flip-flop.

17 Claims, 4 Drawing Figures

PHONOGRAPH TURNTABLE CONTROL SYSTEM

BACKGROUND OF THE INVENTION

The invention conerns a phonograph turntable control system, provided with means for lifting and lowering the the tone arm, means for swinging the tone arm horizontally, means for detecting when the tone arm has been lowered onto a record and when the tone arm has reached the end of a record, and provided with touch-activated switches or touch buttons activated by the user, with settable and resettable electrical or electronic storage devices which register commands for the swinging, lifting and lowering of the tone arm and for turning on and off the drive motor for the latter.

In conventional phonographs, the control functions for the platter motor and the tone arm are implemented using predominantly mechanical means. Use is typically made of transmissions, gearing, levers, and the like. However, mechanical components such as these wear and age quite rapidly and are very susceptible to malfunction.

For certain special functions, it has already been proposed to make use of nonmechanical control devices which make for a considerable improvement in overall phonograph turntable construction. For example, German patent DT-PS No. 1,243,412 discloses a shutoff system for the platter drive motor of a phonograph turntable. The tone arm has connected to it a light shield which, when the tone arm swings, moves through the light path of a photoelectric detector. The speed of swinging movement of the tone arm is sensed, and when a certain speed of swinging movement is reached, the platter drive motor is shut off by means of a transistor-controlled switching relay. An RC-circuit receives the output signal of the photodetector and produces a voltage whose magnitude is dependent upon the rate of change of the light-dependent current produced by the photodetector.

German published patent application DT-OS 1,810,983 discloses another photoelectric switching system for phonograph turntables. The photoelectric switching system includes a stationary light source and a stationary light detector. A deflecting mirror is mechanically coupled to the tone arm and moves as the tone arm becomes inwardly displaced during tracking of the spiral record groove. The deflecting mirror is preferably oriented perpendicular to a radial plane which passes through the swinging axis of the tone arm. When the tone arm reaches a position calling for initiation of a switching operation, the deflecting mirror directs the light from the light source onto the light detector.

Other automatic switching devices are known in the art, for switching off a phonograph at the end of a record, for lowering the tone arm and for controlling the tone-arm drive mechanism, for example in German published patent applications DT-OS No. 19 57 562, DT-OS No. 20 54 880, DT-OS No. 20 11 005, and DT-OS No. 10 54 673, and also in German allowed patent application DT-AS No. 19 17 241. However, these various automatic switching systems relate to various individual aspects of electronic phonographic control.

The Audiodynamics Corporation (ADC Accutrac 4000, brochure AVO 17608) produces an automatic phonograph turntable in which various functions can be triggered by pushbutton action or by wireless remote control. However, this known system is not provided with sensor operated control elements.

Finally, German published patent application DT-OS No. 21 04 692 discloses a system in which the various functions to be performed for turntable control are made to have a much more automatic character, and are implemented using electronic means. The tone arm is moved by two electromechanical positioning devices, one for horizontal swinging of the tone arm, the other for vertical lifting and lowering of the tone arm. Use is made of two electrical storage devices for storage of swing-in and swing-out information. The tone arm is lifted as soon as one of the storage devices registers a signal. Swinging of the tone arm is not possible until after the lifting movement of the tone arm has been completed. The storage devices are erased when tone-arm-position transducers signal the end of the operation involved. The use of settable storage devices makes it possible to dispense with the use of electrical switches of the type which must be held locked in activated position by mechanical locking means; instead, use can be made of touch-activated switches, very-low-force touch buttons, and the like.

The present invention proceeds from the state of the prior art last referred to.

SUMMARY OF THE INVENTION

It is a general object of the invention to provide a turntable control system which uses electronic components to control the lifting, lowering and swinging of the tone arm, and in which manual initation of automatic operations can be performed using simple touch-activated switches, momentary switches activated by very-light-pressure touch-button action, and the like, so that manual initiation of automatic operations can be performed with very great ease and using a minimum of manual force.

These objects can be met, in the preferred embodiment of the invention, using first, second and third electronic digital storage devices. When the user presses a touch-activated switch a first time, the first digital storage device becomes set and furnishes a platter-motor-start signal to the control electronics of the platter drive motor. If the touch-activated switch is pressed a second time, the first digital storage device becomes reset, and the signal commanding that the platter drive motor operate terminates. Assumption of the set state by the first digital storage device causes the second digital storage device to produce at its output a signal which commands inward swinging movement of the tone arm. The third digital storage device is operative, when the first digital storage device is in its motor-not-operate state, for producing at its output a signal which commands outward swinging movement of the tone arm. The swing unit of the turntable, which swings the tone arm inward or outward, is activated in dependence upon the signals produced at the outputs of the second and third digital storage devices. The path of signal information between the second and third storage devices, on the one hand, and the tone-arm swing unit, on the other hand, includes a controllable switch. The setting of this switch is controlled by the lift unit for the tone arm, to prevent operation of the tone-arm swing unit except when the lift unit has already raised the tone arm to its lifted position. The lift unit becomes activated, to raise the tone arm, in response to a signal furnished at the output of an OR-gate. The OR-gate has at least two inputs, one connected to receive a signal from the output of the third digital storage device, the other connected to receive a signal from a touch-activated switch which the user touches when he wishes the tone arm to be lifted, for example, in the middle of the playing of a record.

With the inventive system, incorrect manual initiation of automatically performed operations becomes almost impossible. Also, with the inventive concepts, it becomes possible to combine an automatic touch system with a cueing function.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The embodiments disclosed herein are modifications of the system disclosed in commonly owned copending U.S. patent application Ser. No. 835,535, filed Sept. 22, 1977, the entire disclosure of which is is incorporated herein by reference.

Figure 1:
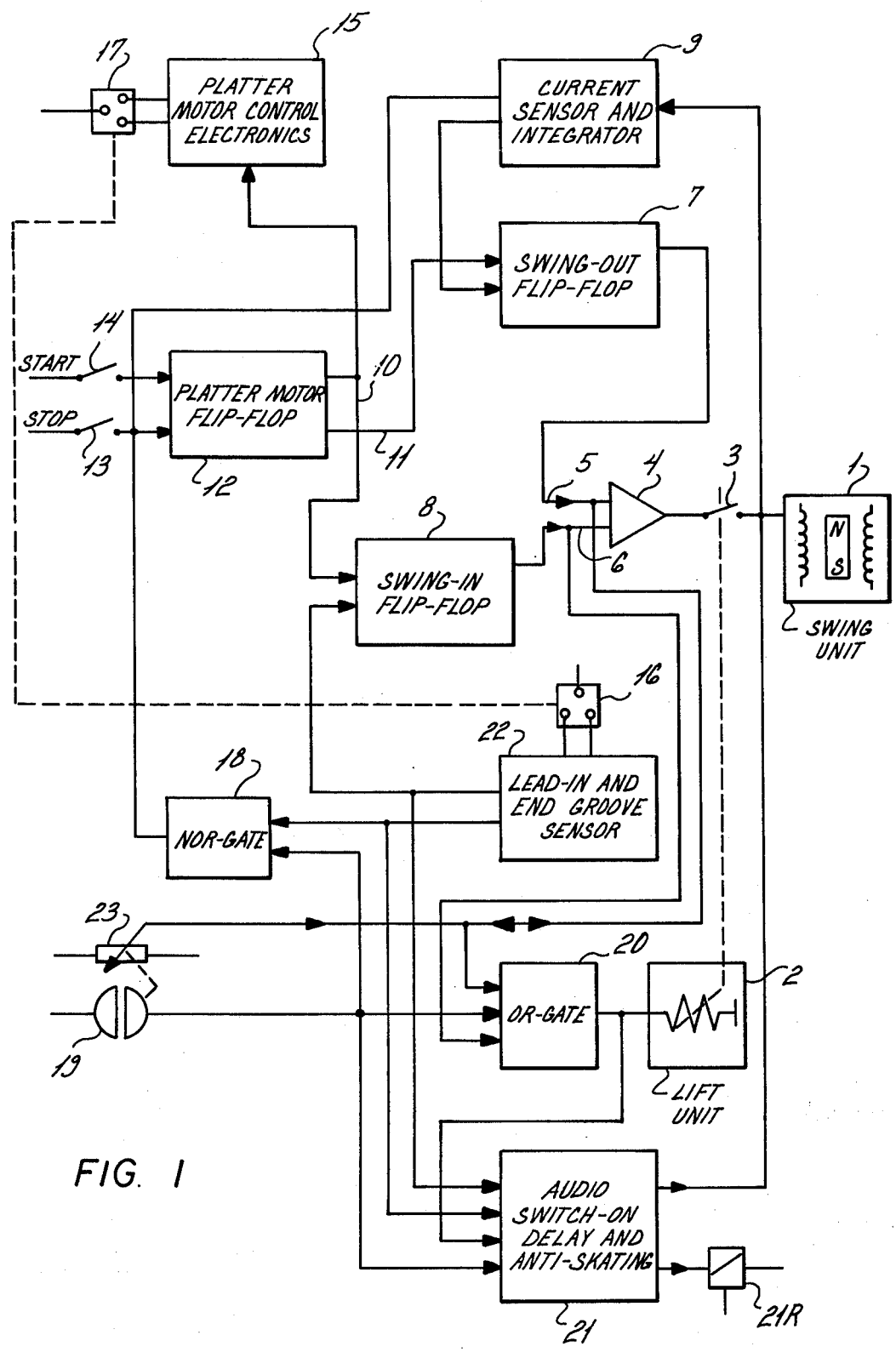
FIG. 1 is a schematic block diagram of a first embodiment of the invention.

FIG. 1 depicts a schematic block diagram of an exemplary embodiment of the inventive turntable control system. Mainly, the control system controls the operation of two devices: the swing unit 1 which swings the tone arm of the turntable, and the lift unit 2 which lifts and lowers the tone arm. The swing unit 1 is controlled, through the intermediary of a switch 3, by a control amplifier 4. The swing unit 1 per se is a rotary electromagnetic device, for example such as disclosed in FIG. 12 of German published patent application DT-OS No. 21 04 692. Control amplifier 4 has two inputs 5, 6 of which input 5 receives the signals which command that the tone arm be swung outward, whereas input 6 receives the signals which command that the tone arm be swung inward. Input 5 is connected to the output of a swing-out flip-flop 7, whereas input 6 is connected to the output of a swing-in flip-flop 8.

If, while the tone arm is being swung outward, it is stopped by an obstacle or hits against its outer end stop, the current drawn by the rotary electromagnetic swing unit 1 will rise. This current rise is sensed by a current sensor and integrator unit 9. The lower output of unit 9 is connected to the reset input of swing-out flip-flop 7. Accordingly, in response to the aforementioned current rise, the unit 9 resets the swing-out flip-flop 7, and thereby erases the swing-out command signal at the output of flip-flop 7.

Additionally, the output of current sensor and integrator unit 9 is connected to the stop input of a motor flip-flop 12 for the platter motor. The current sensor of unit 9 (or equivalently a voltage sensor), in cooperation with an integrator connected to its output, can, when the current or voltage of swing unit 1 varies past a preselected positive or negative threshold value because the tone arm has encountered an obstacle or an end stop, and depending upon the operating phase involved (swing-in or swing-out) either reset motor flip-flop 12 and set swing-out flip-flop 7 and reset swing-in flip-flop 8 or reset the swing-out flip-flop 7. In the first case, stopping of the platter motor is triggered, the tone-arm swing-in is stopped and the tone-arm swing-out is initiated; in the second case, the swing-out of the tone arm is terminated, when the tone arm has just about reached its starting or rest position.

The input of swing-out flip-flop 7 is additionally connected to the output 11 of platter-motor flip-flop 12, this flip-flop output 11 being associated with the flip-flop input to which the touch-activated stop switch 13 is connected. The swing-in (upper) input of swing-in flip-flop 8 is connected to the (upper) output 10 of motor flip-flop 12 associated with the (upper) flip-flop input to which a touch-activated start switch 14 is connected. Output 10 of turntable-motor flip-flop 12 is furthermore connected to the motor control electronics 15 of the platter drive motor.

The reset input of swing-in flip-flop 8 is connected to the output of a lead-in and end-groove sensor 22. Sensor 22 is operative for producing a lead-in-groove signal when the tone arm has been displaced to a position corresponding to the location of the lead-in groove of a phonograph record, and is likewise operative for producing an end-groove signal when the tone arm has been displaced to a position corresponding to the location of the end groove of a phonograph record. Inasmuch as the location of the lead-in groove of a phonograph record depends upon the size of the record, use is made of a changeover switch 16 which is coupled to the rpm selector 17 of the phonograph, in order to correlate the location of the lead-in groove of the record with its rpm and accordingly its diameter. When sensor 22 detects that the tone arm has reached the end groove of a record, it applies a signal to the upper input of a NOR-gate 18. The lower input of NOR-gate 18 is connected to a manual control 19, which is also connected to the middle input of an OR-gate 20 and to the bottom input of a logic circuit 21. Logic circuit 21 performs an antiskating compensation function, and certain other compensating functions discussed further below.

The manual control 19 is essentially comprised of a rotary, circular, touch-responsive knob, provided with a finger depression. If the user lays his finger into the finger depression of knob 19, this results in the generation of a signal which commands that the tone arm be lifted. This command signal is transmitted via the OR-gate 20 to the lift unit 2. If the user turns the rotary knob 19, in one rotary direction or the other, this adjusts the setting of a cooperating potentiometer 23 and makes possible manual adjustment of the speed at which the lifted tone arm will swing. Specifically, potentiometer 23, from its tap, furnishes to input 5 of control amplifier 4, a voltage component which is superimposed upon the voltage component furnished from the output of swing-out flip-flop 7.

The output of OR-gate 20 is connected to the aforementioned lift unit 2. In the exemplary embodiment, lift unit 2 is a hot-wire device; i.e., hot-wire lift unit 2 positively lifts the tone arm or permits the tone arm to lower, depending upon whether heating current flows through the hot wire of the lift unit or not. As indicated by the broken line extending from lift unit 2 to switch 3, the normally open switch 3 is closed only when the lift unit 2 is holding the tone arm in lifted position. Accordingly, unless the tone arm is in lifted position, swing unit 1 will not be energized and the tone arm will not swing in or out.

The lift unit 2 raises the tone arm in three situations: when the touch-responsive manual control 19 is touched; and/or when the swing-out flip-flop 7 applies a swing-out command signal to input 5 of control amplifier 4; and/or when a swing-in command signal is applied to input 6 of control amplifier 4.

Thus, the tone-arm control system depicted in FIG. 1 comprises control electronics including at least three flip-flops 7, 8, 12 which, together, can establish at least the following distinguishable states: platter motor on; platter motor on and tone-arm swing-in; platter motor off and tone-arm swing-out; and platter motor off. Lift unit 2 is activated through the intermediary of the OR-gate 20, which is operative for transmitting signals at least for the state "platter motor on and swing-in" and for the state "platter motor off and swing-out".

Figure 2:
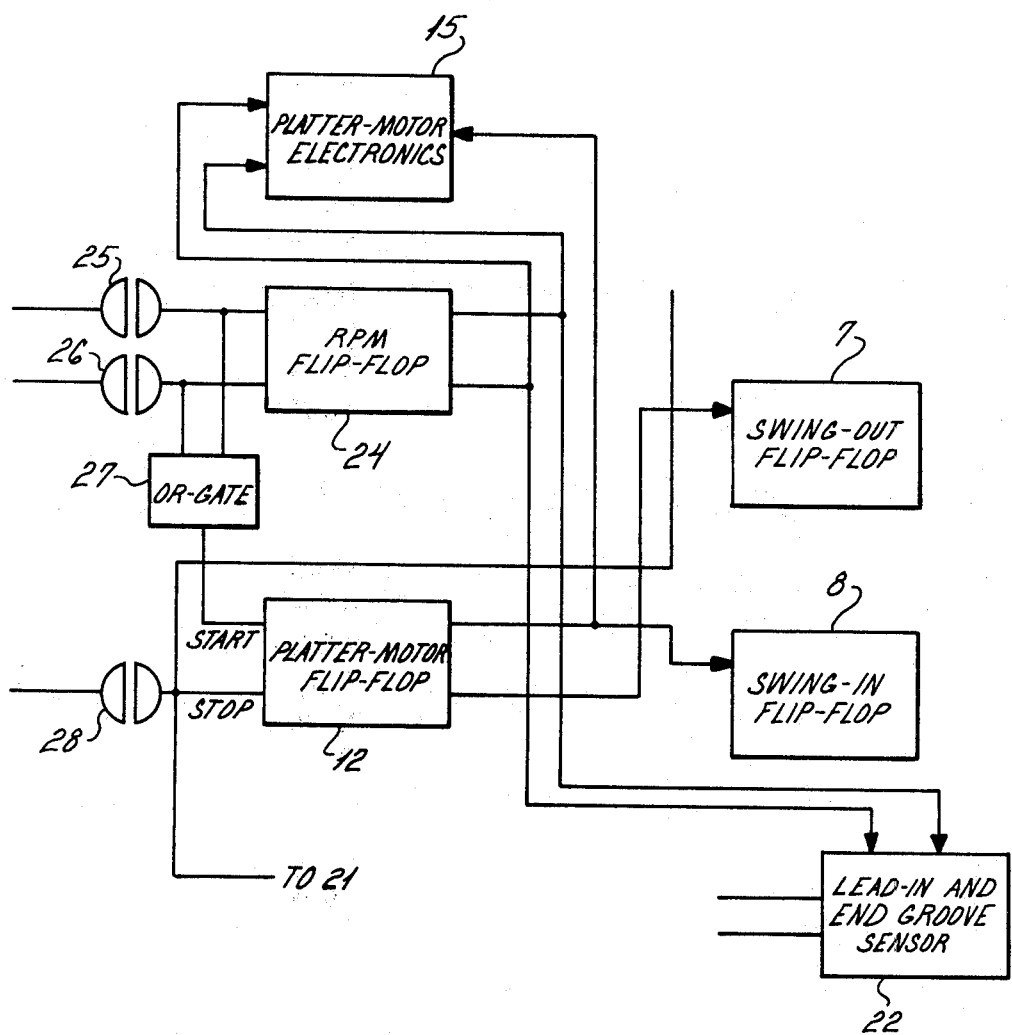
FIG. 2 is a schematic block diagram of a portion of a modified second embodiment, depicting only that part of the second embodiment which differs from the embodiment of FIG. 1.

FIG. 2 depicts a modification of the exemplary embodiment of FIG. 1, only the modified part of the system being depicted. In this embodiment, the control system includes two touch-activated selector switches 25, 26 for selecting two different turntable speeds, e.g. 33 rpm and 45 rpm. Rpm selector switches 25, 26 are connected to the inputs of an rpm storage 24. When one or the other of the rpm selector switches 25, 26 is activated, an OR-gate 27 transmits a signal to the set input of platter-motor flip-flop 12, causing the latter to generate a start command for the platter motor. The rpm storage 24 applies a signal to the platter-motor control electronics 15, indicating the rpm at which the platter motor is to operate. Additionally, storage 24 applies a signal to the lead-in and end-groove sensor 22, indicating where the lead-in groove of the record to be played will be located. Preferably, the lead-in groove sensing device within sensor 22 includes a plurality of photoelectric detectors, each associated with a different selectable rpm, and each operative, when activated by a signal from rpm storage 24, for detecting when the tone arm has been swung to a position corresponding to the location of the lead-in groove of a phonograph record of the size associated with the selected platter speed.

Touch-activated manual control 28 can be used to set the stop input of turntable-motor flip-flop 12, set the swing-out flip-flop 7 to its swing-out state, and apply an input signal to the audio switch-on delay and anti-skating stage 21.

In FIG. 1, the touch-activated switches 13, 14 can be pure touch switches which include no moving parts, for example of the type where the user's finger itself completes a current path, where the body heat transmitted from the user's finger causes the touch switch to generate a signal, and the like. Alternatively, the touch-activated switches 13, 14 could be very-light-pressure momentary switches, e.g., pushbutton switches which are closed only so long as the user presses upon them with the pressing force required to hold the switches closed being extremely low, i.e., so that a very light brief touch upon them causes them to become briefly closed. If very-light-pressure momentary switches are employed, then the two switches 13, 14 could, for example, be activated by means of a single very-light-pressure rocker which the user would briefly and lightly touch at one end to briefly close switch 14 or at its other end to briefly close switch 13. As a still further possibility, the two switches 13, 14 could be replaced by a single momentary switch, either a pure touch-activated switch having no moving parts or, for example, a very-light-pressure push-button-type momentary switch. In that event, the platter-motor flip-flop 12 could be of the type which, in addition to its set and reset inputs, is provided with a complementing or state-reversal input, to which the single touch-activated switch would then be connected. The first time the user touches the single touch-activated switch, the brief signal produced by the switch and applied to the complementing or state-reversal input of flip-flop 12 would cause the flip-flop 12 to assume its motor-operate state; the next time the user touches the single touch-activated switch, the brief signal applied to the state-reversal input of the flip-flop 12 would cause the latter to assume its motor-not-operate state. The same possibilities apply to the touch-activated switch 28 and motor flip-flop 12 in the modified system shown in FIG. 2.

Figure 3:
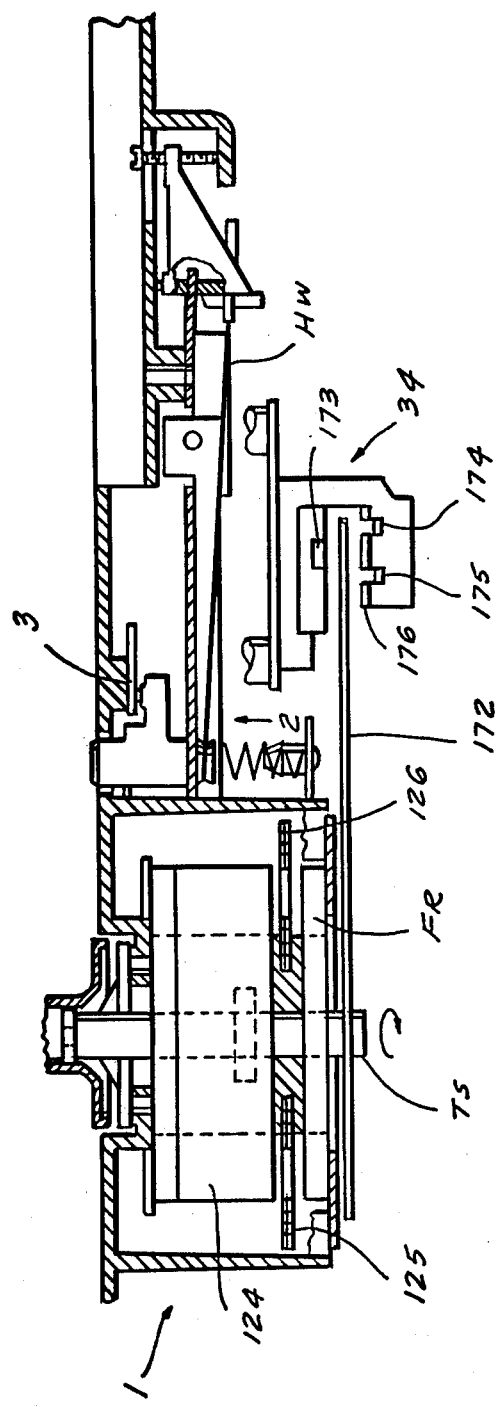
FIGS. 3 and 4 depict mechanical aspects of the swing unit and the lift unit for the tone arm of the turnable.

In FIG. 1, and likewise for the corresponding components in FIG. 2, circuit details concerning, for example, the swing unit 1, the control amplifier 4, the current sensor and integrator unit 9, the audio switch-on delay (muting) and anti-skating stage 21, the audio switch-on relay 21R, lead-in and end-groove sensor 22, their internal circuitry, their interconnection and their cooperation, can be had from FIG. 3 of commonly owned copending application Ser. No. 835,535. However, it is to be noted that the current sensor and integrator receives a current (or voltage) from the swing unit 1, dependent upon the mechanical load applied to swing unit 1. When this current (or voltage) exceeds a predetermined amount, it charges an integrating capacitor. Thus, if this current exceeds a predetermined amount for a predetermined length of time, this indicates that the tone arm, during swing-in or swing-out, has encountered an obstacle or its end stop. In such a situation, stage 9 produces a signal at its upper output (e.g., if the tone arm has encountered its end stop during swing-out) or a signal at its lower output (e.g., if the tone arm has encountered an obstacle during swing-in).

The audio switch-on delay (muting) and anti-skating stage 21 performs muting and anti-skating functions. Circuit details may be had from FIG. 3 of the related application identified above. Generally, stage 21 causes audio relay 21R to open a switch in the audio system, and thereby prevent the reproduction of sound (muting), during times when sound reproduction would be annoying, e.g., when the tone arm is being lowered into contact with the record, when the tone arm is being raised out of contact with the record, when the end-groove of the record has been reached and the stylus is riding upon the dead space at the end of the record, and so forth. The anti-skating function is performed by stage 21 (as indicated by the connection between the upper output of 21 and swing unit 1 in FIG. 1) by stabilizing the driving current for the swing unit in the manner of a constant-current source, to prevent skating. Again, circuit details are disclosed in FIG. 3 of application No. 835,535.

Figure 4:
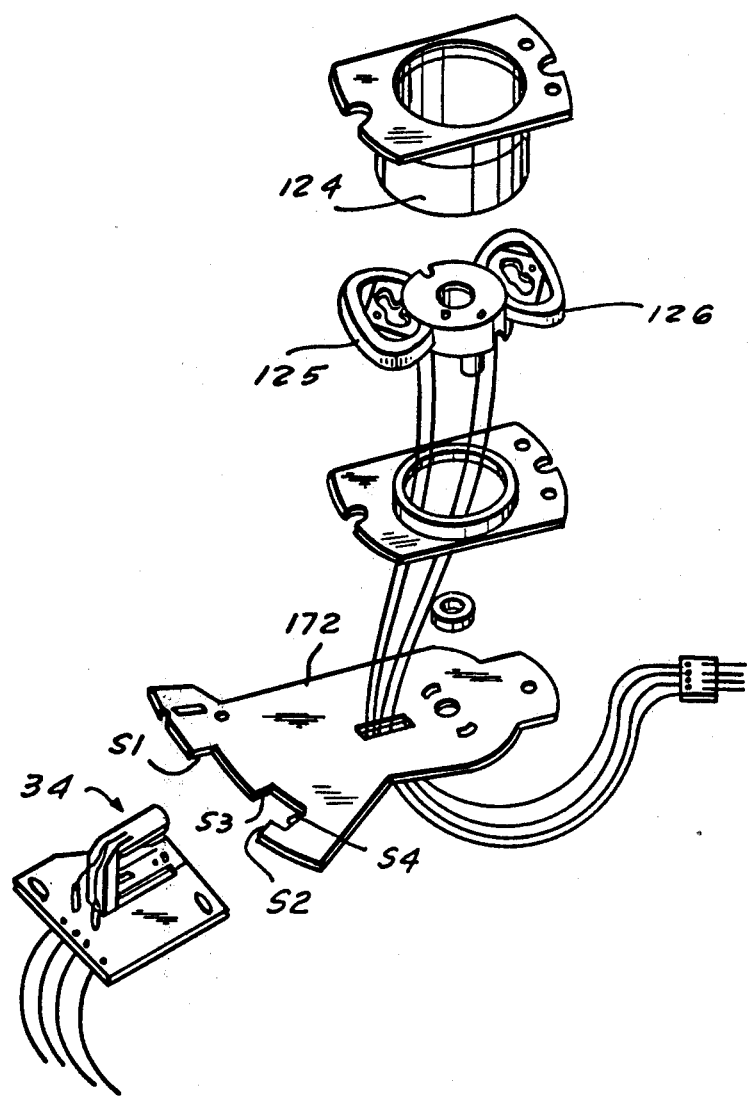

FIGS. 3 and 4 depict certain mechanical details of the swing unit 1 and the lift unit 2. The tone-arm mounting shaft is denoted by TS and is turned by the swing unit 1. The swing unit 1 includes two stator windings 125, 126 which, as best seen in FIG. 4, are of 90° sector configuration, as well as a rotor magnet 124, a lower flux-return ring of ferromagnetic material FR, and an upper flux-return ring at the top of the annular rotor magnet 124. Also shown in FIG. 3 is the hot wire HW of the lift unit 2 and the lift-unit-controlled switch 3, discussed earlier with respect to FIG. 1. Mounted on the tone-arm mounting shaft TS is a light shield 172. Light shield 172 swings through the light detector unit generally denoted by 34, between a light source 173 and phototransistors 174, 175 thereof. The light detector unit 34 includes an apertured light screen 176, behind the apertures of which the two phototransistors 174, 175 are located. The two phototransistors 174, 175 are located at different respective radial distances from the axis of the tone-arm mounting shaft TS.

As best seen in FIG. 4, the light shield 172 is provided with two apertures, of different respective radial spacing from the axis of the tone-arm mounting shaft. The radially outer aperture, whose ends are denoted by S1, S2, has a tangential angular span corresponding to the radial length of the modulated zone of, for example, a 33 rpm phonograph record. The radially inner aperture, whose ends are denoted by S3, S4, has a tangential angular span corresponding to the radial length of the modulated zone of, for example, a 45 rpm phonograph record.

When the tone arm is swung inward, the light shield 172 coupled thereto turns clockwise (as viewed in FIG. 4). During the inward swing, first the aperture edge S1 moves into the region of the phototransistors in detector unit 34; aperture edge S1 corresponds to the lead-in groove of, for example, a 33 rpm record. Next, aperture edge S3 moves into the phototransistor region; edge S3 corresponds to the lead-in groove of, for example, a 45 rpm record. Next, aperture edge S2 moves into the phototransistor region; aperture edge S2 corresponds to the end groove of, for example, a 33 rpm record. Finally, aperture edge S4 moves into the phototransistor region; edge S4 corresponds to the end groove of, for example, a 45 rpm record.

Returning to FIGS. 1 and 2, the illustrated flip-flops can be electronic flip-flops of the type comprised of cross-coupled amplifier elements, or the like, and this is preferred. However, in general, the devices 7, 8, 12 and 24 could be electrical storage devices of other non-mechanical types, e.g. magnetic storage cells, and the like. Also, whereas bistable (i.e., two-state) storage devices are herein disclosed for storage devices 7, 8, 12 and 24, other storage devices having equivalent storage states, and thus capable of performing functionally equivalent command-signal storage, could also be used.

It will be understood that each of the elements described above, or two or more together, may also find a useful application in other types of circuits and constructions differing from the types described above.

While the invention has been illustrated and described as embodied in a two-speed phonograph turntable control system, it is not intended to be limited to the details shown since various modifications and structural changes may be made without departing in any way from the spirit of the present invention.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an automatic turntable control system for phonographs, of the type including lifting means for lifting and lowering the tone arm of the turntable, swinging means for swinging the tone arm of the turntable inward and outward, and a platter motor for rotating the platter of the turntable, in combination therewith, a first flip-flop having a first state and a second state; means connected to the platter motor and to the first flip-flop and operative for causing the platter motor to operate or not operate in dependence upon the state of the first flip-flop; start-stop switch means operative when activated by the user to start the turntable for setting the first flip-flop to the first state thereof and operative when activated by the user to stop the turntable for setting the first flip-flop to the second state thereof; a second flip-flop connected to the first flip-flop and having a first state and a second state and connected to assume its first state when the first flip-flop assumes the second state thereof, a third flip-flop connected to the first flip-flop and having a first state and a second state and operative for assuming its first state when the first flip-flop assumes the second state thereof; switch means connecting the swinging means to the second and third flip-flops, and operative when conductive for transmitting from the second flip-flop to the swinging means an activating signal causing the swinging means to swing in the tone arm when the second flip-flop is in the first state thereof, and for transmitting from the third flip-flop to the swing means an activating signal causing the swinging means to swing out the tone arm when the third flip-flop is in the first state thereof; switch-control means connected to the switch means and to the lift means and operative for rendering the switch means conductive when the lift means has lifted the tone arm; lift-tone-arm switch means operative when activated by the user for generating a lift-tone-arm command signal; and OR-gate means having an output connected to the lift means and having inputs connected to the lift-tone-arm switch, to the second flip-flop and to the third flip-flop and operative for transmitting an activating signal to the lift means in response to the lift-tone-arm command signal, in response to assumption of the first state by the second flip-flop, and in response to assumption of the first state by the third flip-flop.

2. In a system as defined in claim 1, the swinging means being electromagnetic and energized by electric current, the energy drawn by the swinging means undergoing a change when during tone-arm swing-in or swing-out swinging of the tone arm is physically blocked, further including detecting means operative for indirectly detecting when swinging of the tone arm is physically blocked by sensing the change in the energy drawn by the electromagnetic swinging means and operative upon such detection for causing the first flip-flop to assume its second state.

3. In a system as defined in claim 2, the detecting means comprising means responsive to the increased current drawn by the electromagnetic swinging means when swinging of the tone arm is physically blocked.

4. In a system as defined in claim 2, the detecting means comprising means operative in response to the change in the energy drawn by the electromagnetic swinging means when swinging of the tone arm is physically blocked during tone-arm swing-out for causing the third flip-flop to assume its second state.

5. In a system as defined in claim 2, the detecting means comprising means operative in response to the change in the energy drawn by the electromagnetic swinging means when swinging of the tone arm is physically blocked during tone-arm swing-in for causing the second flip-flop to assume its second state and causing the third flip-flop to assume its first state.

6. In a system as defined in claim 1, further including sensing means operative for sensing the extent to which the tone arm has been swung inward and, when the tone arm has been swung inward to a position corresponding to the lead-in groove of a record, causing the second flip-flop to assume its second state.

7. In a system as defined in claim 1, further including sensing means operative for sensing the extent to which the tone arm has shifted inward during the tracking of a groove of a phonograph record and, when the tone arm has reached a position corresponding to the end groove of the record, causing the first flip-flop to assume its second state.

8. In a system as defined in claim 7, further including an OR-gate having an output connected to the first flip-flop for furnishing thereto a signal causing the latter to assume its second state and having one input connected to receive the lift-tone-arm command signal and another input connected to receive a signal from the sensing means when the tone arm reaches the end-groove position.

9. In a system as defined in claim 6, the sensing means including a light-blocking structure coupled to the tone arm, and a plurality of light detectors each located to be subjected by the light-blocking structure to a change of illumination state when the tone arm has been swung inward to an extent corresponding to the location of the lead-in groove of a record of a different respective diameter.

10. In a system as defined in claim 9, further including selecting means connected to the platter motor for selecting the rotary speed of the platter and means operative for activating and deactivating the light detectors in dependence upon the setting of the selecting means.

11. In a system as defined in claim 9, the light-blocking structure being provided with a plurality of apertures whose tangential span corresponds to the modulated radial length of a phonograph record.

12. In a system as defined in claim 1, further including sensing means operative for sensing when the tone arm has been swung inward to a position corresponding to the lead-in groove of a phonograph record and for sensing when the tone arm has been inwardly displaced to a position corresponding to the end groove of a phonograph record and generating signals indicative of these positions of the tone arm, and time-delay means operative for generating an audio switch-on signal after the elapse of a predetermined time delay in response to termination of the lift-tone-arm command signal, in response to termination of the signals produced by the sensing means, and in response to termination of the transmission of an activating signal to the lift means.

13. In a system as defined in claim 12, further including anti-skating means operative for compensating for tone-arm skating force, the time-delay means including means operative in response to each of said terminations for switching on the anti-skating means gradually and after the elapse of a time delay.

14. In a system as defined in claim 6, further including selecting means coupled to the platter motor and operative for selecting the rotary speed of the platter, and means for correlating the position of the tone arm corresponding to the lead-in groove of a phonograph record with the setting of the selecting means.

15. In a system as defined in claim 1, the swinging means being a rotary electromagnetic swinging means comprising two diametrally oppositely located windings each occupying a 90° sector, an axially polarized two-pole annular magnet and two annular flux-return structures of magnetically conductive material.

16. In a system as defined in claim 14, the selecting means comprising a plurality of speed-selector switches, the correlating means including at least a fourth flip-flop connected to the speed-selector switches for registering different signals representative of different selected speeds, and means connecting the fourth flip-flop to the sensing means for correlating the operation of the sensing means with the signal registered by the fourth flip-flop.

17. In a system as defined in claim 14, further including an OR-gate having an output connected to the first flip-flop for applying thereto a signal causing the latter to assume its first state and having inputs connected to receive signals from the speed selector switches, the speed selector switches when activated accordingly causing the first flip-flop to assume its first state and thus forming part of said start-stop switch means.

* * * * *